United States Patent [19]

Suzuki

[11] Patent Number: 5,038,167

[45] Date of Patent: Aug. 6, 1991

[54] PHOTOGRAPHIC PRINTING METHOD AND PHOTOGRAPHIC PRINTER

[75] Inventor: Kenji Suzuki, Kanagawa, Japan

[73] Assignee: Fuji Photo Film Co., Ltd., Kanagawa, Japan

[21] Appl. No.: 599,915

[22] Filed: Oct. 19, 1990

[30] Foreign Application Priority Data

Oct. 20, 1989 [JP] Japan .................. 1-274644

[51] Int. Cl.$^5$ ............................................. G03B 27/52
[52] U.S. Cl. ........................................ 355/41; 355/55; 355/77
[58] Field of Search .................... 355/40, 41, 50, 51, 355/55, 56, 77; 358/76; 354/484

[56] References Cited

U.S. PATENT DOCUMENTS

| | | | |
|---|---|---|---|
| 4,482,924 | 11/1984 | Brownstein | 355/404 |
| 4,809,064 | 2/1989 | Amos et al. | 358/76 |
| 4,908,654 | 3/1990 | Holroys | 355/41 |
| 4,963,917 | 10/1990 | Taniguchi et al. | 354/484 |

FOREIGN PATENT DOCUMENTS 1102539 4/1989 Japan .

Primary Examiner—Richard A. Wintercorn
Attorney, Agent, or Firm—Sughrue, Mion, Zinn, Macpeak & Seas

[57] ABSTRACT

Trimming prints are made from a plurality of image frames in photographic film, in order of trimming magnification, by reading out trimming magnification data for each frame as well as frame position data used for positioning each frame. The adjustment of the focal length of a zoom lens is effected in the order changed following the order of the trimming magnification so as to make a series of prints in the shortest time. In accordance with a preferred embodiment of the invention, frames are printed in the order of the permutation, yielding the shortest processing time in rearrangement of the sequential frames. Therefore, efficiency is improved greatly in shifting the frames and adjusting the focal length of the zoom lens.

14 Claims, 3 Drawing Sheets

PHOTOGRAPHIC PRINTING METHOD AND PHOTOGRAPHIC PRINTER

BACKGROUND OF THE INVENTION

The present invention relates to a photographic printing method and to a photographic printer for making trimming prints from photographic film having a plurality of frames recorded thereon. The invention relates more particularly to a photographic printing method and a photographic printer capable of making trimming prints of successive frames in an efficient printing order.

A print in which a subject is photographed in enlarged fashion according to telephotography is obtained conventionally by using a camera having a zooming function. It is difficult to make such a camera more compact and inexpensive because of the use of a zoom lens. Therefore, it is convenient for the zooming function to be applied not only to the camera but also to a photographic printer such as one which has a zoom lens for a printing lens in order to enlarge a frame to obtain a trimming print. In a trimming print, a partial area of the frame is enlarged to be printed in a manner similar to telephotography. For this purpose, it has been suggested that data as to the trimming magnification at which the printer should enlarge the image be recorded on the recording medium such as the film at the time of photo-taking in correspondence with the frame.

However, if the printing order follows the succession of frames when the focal length of the zoom lens in the printer is adjusted in accordance with the trimming magnification data to subject each frame to exposure to print at the specified trimming magnification, then problems arise in that a long time is needed to set the focal length of the zoom lens. As a result, the efficiency of making trimming prints is low.

SUMMARY OF THE INVENTION

Therefore, it is one object of the present invention to provide a photographic printing method and a photographic printer which adjust the focal length of the zoom lens of the printer and set the successive frames in the printing station very efficiently.

In order to achieve the above and other advantages of this invention, the trimming magnification data is read out for each frame of a series of frames in the photographic film, and the series of frames is printed in the order of the read out trimming magnification.

A preferred embodiment of the present invention reads out frame position data and trimming magnification data for each of a series of frames in the photographic film, obtains permutations by rearranging frames of the series, calculates processing time to be taken by each of the permutations based on the time necessary to shift the film between adjacent frames and time for changing the trimming magnification, specifies a permutation taking the shortest processing time of the permutations, and prints the series of frames in exposure in the order of the specified permutation.

As the construction of the present invention causes prints to be made in the order of trimming magnification, the time necessary to adjust the zoom lens can be kept as short as possible, so that printing efficiency will be improved to a corresponding degree. Efficient adjustment of the zoom lens reduces further the drive time of the lens driver so that the durability of the zoom lens and the lens driver will be enhanced. Each processing time according to a permutation to rearrange the frame order is calculated in order to make prints in the order of the permutation resulting in the shortest processing time, so that prints can be made more efficiently in consideration of the film shifting time to enhance printing efficiency.

BRIEF DESCRIPTION OF THE DRAWINGS

The above object and advantages of the present invention will become more apparent from the following detailed description when read in connection with the accompanying drawings, in which.

DETAILED DESCRIPTION OF THE PREFERRED EMBODIMENT

Figure 1:
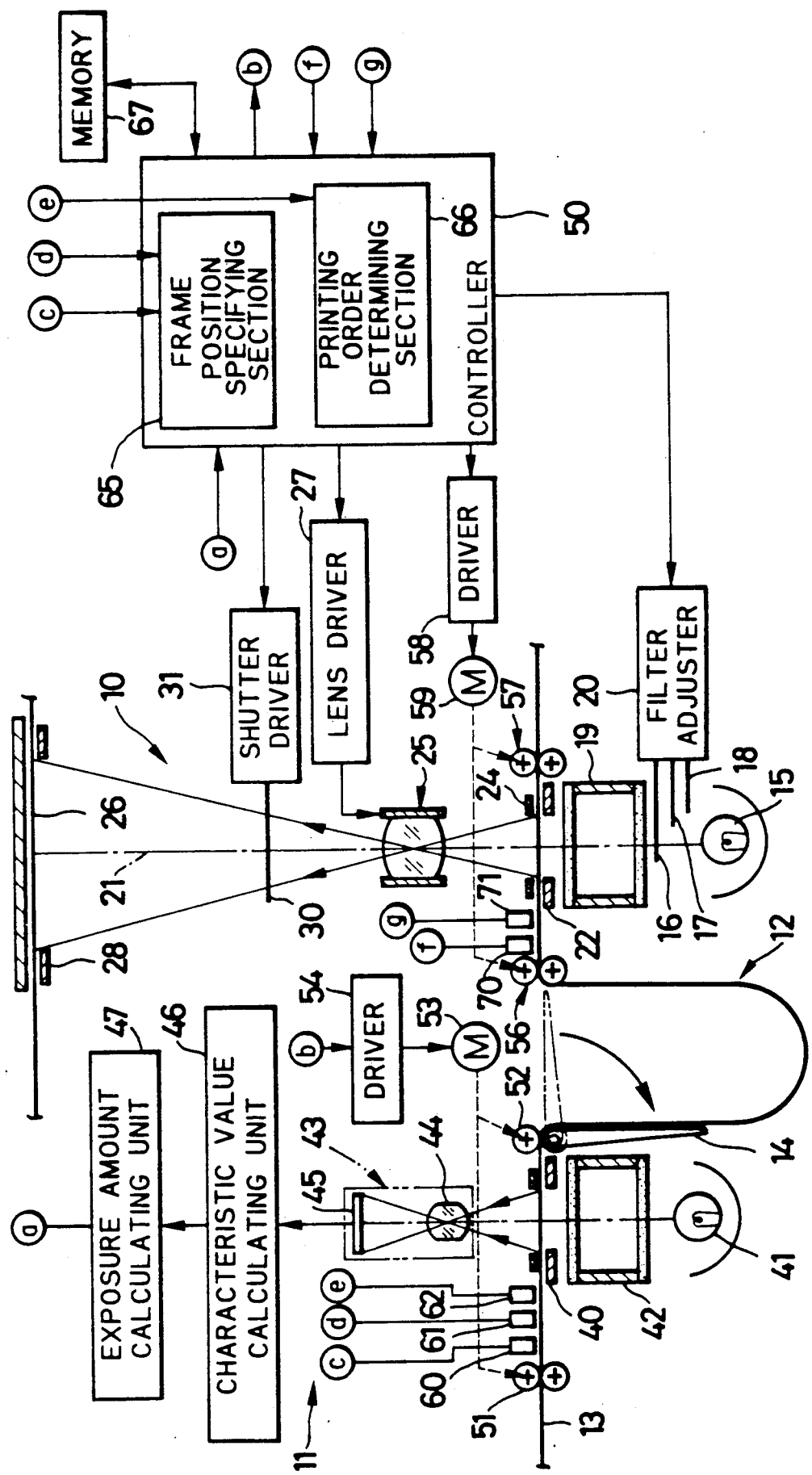
FIG. 1 is a schematic diagram illustrating the photographic printer having a film inspecting function in accordance with the present invention.

FIG. 1 illustrates a photographic printer which includes a printing component 10 and a film inspecting component 11 disposed on the inlet side of the printing component 10. A loop forming passage 12 is arranged along the film passageway between the printing and inspecting components 10 and 11 for making a print with delay after the film inspection. As a negative film 13 is stored in a loop form along the loop forming passage 12 before printing, the inspecting component 11 not only inspects a sequence of frames in the negative film 13, e.g. all frames of a negative film strip corresponding to one film cassette, but also reads out the trimming magnifications recorded on the negative film 13 for all its frames, as will be described later in detail. A guide plate 14 swings so as to be horizontal, so that the front end of the negative film 13 can be guided into the printing component 10 when it passes over the loop forming passage 12. After the front end of the negative film 13 is guided into the printing component 10, the guide plate 14 turns vertical to form a passage for a free loop.

In the printing component 10, white light emanated from a light source 15 enters a mixing box 19 after passing through cyan, magenta and yellow correction filters 16 to 18. A filter adjuster 20 controls the insertion degree of these color correction filters 16 to 18 into an optical path 21 of the printing light so as to regulate the three primary color components and the intensity of the printing light. The mixing box 19 has a structure in which a rectangular tube with mirrored walls has a diffusion plate mounted to each opposing end.

A film holder 22 is disposed at a printing station on which the negative film 13 having been processed is to be set and illuminated by the light transmitted through the mixing box 19. A film mask 24 is mounted on the printing station in order to keep the negative film 13 flat. The film mask 24, which has an opening formed therethrough corresponding to the size of the frame, as is well known, fixes the negative film 13 when it is printed, and is released from fixing the negative film 13 by a solenoid (not shown) when it is transported.

Figure 2A:
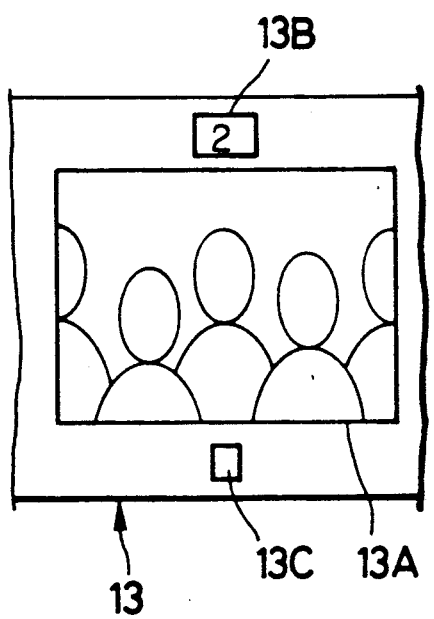
FIG. 2A is a plan view illustrating a negative film with data as to the trimming magnification recorded thereon close to an image frame for use with the photographic printer illustrated in FIG. 1.
Figure 2B:
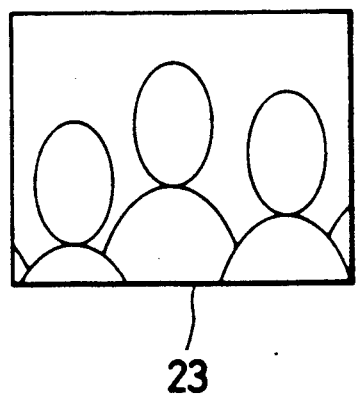
FIG. 2B is a plan view illustrating a photograph obtained from printing the negative film illustrated in FIG. 2A.

The negative film 13 has trimming magnification data 13B recorded thereon close to a recorded frame 13A, as shown in FIG. 2A. The trimming magnification data 13B is recorded adjacent to the recorded frame at the time of photo-taking, so that a print in a manner similar to telephotography will be made by partially assigning the printer an enlarging magnification beyond the zooming operation of the camera. The trimming magnification data 13B consist of an OCR character, a bar code, or a mark. It may be recorded not only on the film but also on a magnetic recording area on the surface of the film cassette. Perforations 13C, formed on the negative film 13 at a constant interval on the side opposite to the trimming magnification data 13B, serve to position the negative film 13 at the exposing position in the camera. The image on the frame 13A is printed at a specified trimming magnification so as to obtain a trimming print 23, as shown in FIG. 2B.

A printing lens 25 in FIG. 1 is disposed over the printing station and focusses the image on the frame 13A of the negative film 13 on to color paper 26. The printing lens 25 consists of a zoom lens whose focal length is adjusted to be a specified trimming magnification by a lens driver 27. Reference numeral 28 designates a paper mask. A shutter 30, arranged between the printing lens 25 and the color paper 26, is to be retracted from the optical path 21 of the printing light for a predetermined period by a shutter driver 31.

The film inspecting component 11 has a film holder 40 for setting the negative film 13 at the inspecting station. A light source 41 and a mixing box 42 are arranged under the film holder 40. White light from the light source 41 is diffused uniformly and illuminates the frame of the negative film on the film holder 40.

A scanner 43, disposed above the film inspecting station, consisting of a lens 44 and an image area sensor 45, as is well known, subjects each point in the frame 13A to photometry in three color separation, and sends the measured photometric values to a characteristic value calculating unit 46. The characteristic value calculating unit 46 calculates various characteristic values from the photometric values, as is well known, and sends them to an exposure amount calculating unit 47. The exposure amount calculating unit 47 calculates the exposure amount from the characteristic values and sends it to a controller 50.

A pulse motor 53 in the inspecting component 11 rotates both guide rollers 51, disposed upstream from the film inspection station and guide rollers 52 disposed downstream therefrom, in synchronous fashion. The motor 53 is controlled by the controller 50 through a driver 54. A pulse motor 59 in the printing component 10 rotates guide rollers 56, disposed upstream from the printing station, and guide rollers 57, disposed downstream therefrom, and is driven by the controller 50 through a driver 58.

A frame sensor 60, a bar code reader 61 for the frame number, and a trimming magnification reader 62 are arranged upstream from the film inspecting station. The frame sensor 60 detects the edge of a frame by detecting a density difference between each frame and the film base so as to specify the position of the frame, and sends the detected edge signal to a frame position specifying section 65 in the controller 50. The bar code reader 61 reads a bar code designating a frame number recorded along the edge of the negative film 13, and sends it to the frame position specifying section 65. The frame position specifying section 65 specifies the position of each frame with reference to the bar code on the basis of the relationship between the film transporting amount and the timing of detection of the bar code as well as the edge of each frame. Such detection of frame position is described in detail in Japanese Patent Laid-Open Publication 1-102537.

The magnification reader 62 reads out the trimming magnification data 13B recorded corresponding to the negative film 13, and sends it to a printing order determining section 66 in the controller 50.

The order determining section 66 determines the printing order in the order in which the trimming magnification increases with reference to the trimming magnification of each frame. This order is specified by arranging the frame numbers in the order of the trimming magnifications with reference to a memory 67 which stores the relationship between a frame number and the trimming magnification of the frame discriminated by the frame number. The controller 50 controls the guide rollers 56 and 57 to rotate following the printing order, and positions the frames sequentially at the printing station every time a print is to be made.

When the frame is set at the printing station, the lens driver 27 is controlled to change the trimming magnification to that specified according to the recorded trimming magnification of the frame to be printed. The position data obtained by setting each frame at the film inspecting station is used to set the frame to be printed at the printing station. Rotation of the pulse motor 59 is controlled to set each frame at the printing station on the basis of the frame number and the timing for detecting the bar code from a frame number bar code 70 arranged upstream from the printing station. It is noted that a warning signal may be generated when the edge of each frame is set deviating from the printing station by detecting the edge beforehand with a frame detecting sensor 71.

Figure 3:
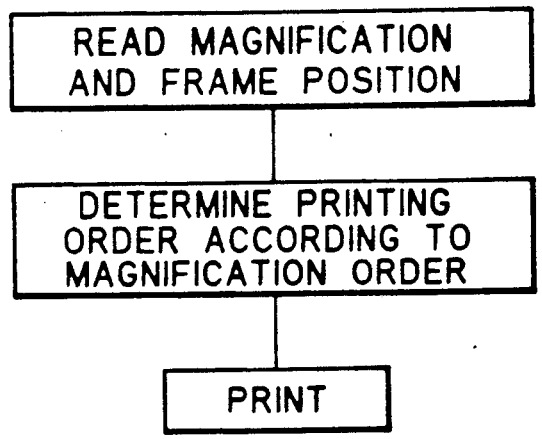
FIG. 3 is a flowchart schematically illustrating the photographic printing method in accordance with the present invention.

The operation of the present embodiment will be described next with reference to FIG. 3. A processed elongated negative film 13, formed by connecting many strips of negative film by use of splicing tape, is transported toward the film inspecting station by the guide rollers 51. During transportation, the frame detecting sensor 60 detects an edge such as a front edge of each frame in the negative film 13. The controller 50 rotates the pulse motor 53 by a predetermined amount in accordance with the edge detecting signal so as to set the detected frame at the film inspecting station. Upon setting this frame, the bar code reader 61 reads the bar code designating the frame number of the negative film 13. According to the timing for detecting the bar code, a counter contained in the controller 50 counts the drive pulses of the pulse motor 53. The frame position data referring to the frame number are obtained, are written in the memory 67 with the frame number as its address, and are used for setting each of the frames at the printing station in the following printing process. During the transportation of the film, the magnification reader 62 reads out the trimming magnification data 13B of each frame on the film 13. The trimming magnification data also are written in the memory 67 with its frame number as its address.

Each point of the frame set at the film inspecting station is subjected to photometry in three color separation automatically by the scanner 43. The obtained photometric values are converted logarithmically and digitally by the characteristic value calculating unit 46. Then, the various characteristic values required for the exposure control are calculated according to the converted photometric values. The exposure amount calculating unit 47 calculates an exposure amount for the frame by use of a well-known exposure amount calculating equation in accordance with the characteristic values. The exposure amount is written in the memory 67 with its frame number as its address.

Similarly each of the frames is set sequentially at the inspecting station to calculate each printing exposure amount. The frames after inspection are pinched by the guide rollers 56 close to the printing station and then stored on the loop forming passage 12 in a loop shape.

When trimming magnification data corresponding to one strip of negative film are obtained the order determining section 66 arranges an order of the frame numbers in accordance with the order of increasing trimming magnification. The arranged order is used as the printing order. Following the thus determined printing order each frame is set at the printing station one after another, on the basis of the frame position data obtained in the film inspecting component 11 for each frame. The controller 50 then controls the filter adjuster 20 in accordance with the calculated exposure amount in order to adjust each color filter 16 to 18 as to the filter setting position. At the time of setting each frame at the printing position, the lens driver 27 is controlled to change the focal length of the printing lens 25 corresponding to a specified trimming magnification. Now, the light source emits light while opening the shutter 30 for a predetermined period by means of the shutter driver 31 to print the image of the frame in the negative film 13 on to the color paper 26. The following frames are printed in a similar manner.

Since the frames are printed according to the order of trimming magnification, adjustment of the printing lens 25 as to focal length can be performed efficiently so as to shorten the overall time required for printing.

The printing order may be decreasing instead of increasing. Further, the printing order may be reversed from increasing magnification to decreasing magnification and back again when printing a strip of negative film follows printing another strip. Such alternate changes in the printing order make it possible to improve efficiency in changing the printing lens 25 as to the focal length.

Although the frame position is specified with reference to the bar code designating the frame number, it may be specified instead with reference to the number of frames counted in accordance with the edge detecting signal from the frame detecting sensor 60. This can make the construction simple as no bar code reader is needed.

Figure 4:
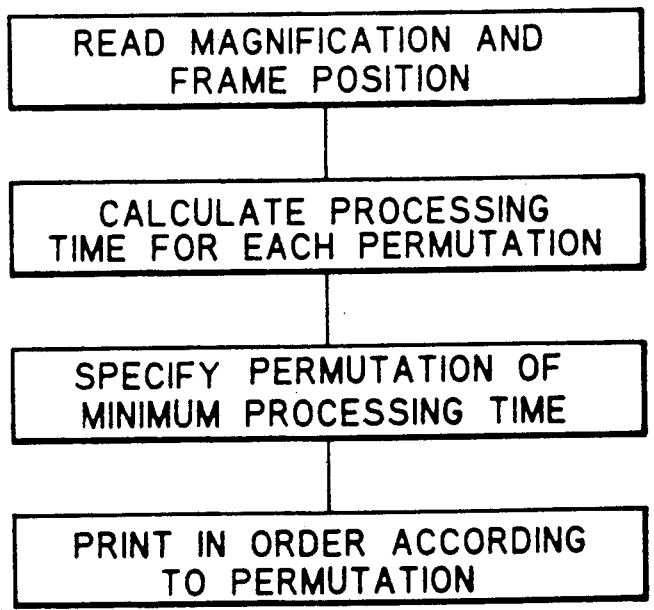
FIG. 4 is a flowchart schematically illustrating another embodiment of the photographic printing method.

FIG. 4 illustrates another preferred embodiment of determining the printing order instead of the above embodiment to determine it simply following the order of magnification. Each trimming magnification of a plurality of, e.g., five successive frames is read out first to obtain all the possible printing orders of the five frames by rearranging them. In other words, all the permutations formed by the five frames are obtained. The total number of the permutations is 5!=120.

The processing time for printing in the order following each of the 120 permutations is calculated next. Specifically, assume that the processing time is to be obtained for the permutation of A-C-D-B-E when the five successive frames are designated as A, B, C, D, and E. The time X is calculated as required for shifting the film from the initial reference position (designated as S) to the frame A position. The time Y then is calculated as required to change the focal length of the printing lens 25 to change the magnification at the initial reference position into that at frame A position. The values X and Y are compared to obtain a larger value which is used as a processing time $T_1$ from the initial reference position to frame A position for the series of frames. Each processing time $T_2$ to $T_5$ is similarly calculated as to the intervals from frame A to frame C, from frame C to frame D, from frame D to frame B, and from frame B to frame E. The five values obtained in this manner are added together so as to obtain the time T corresponding to the permutation A-C-D-B-E. The present calculating process is illustrated in the table as follows:

| Frame | Film Shifting Time X | Trimming Magnification Changing Time Y | Larger Value of X and Y |
| --- | --- | --- | --- |
| A | $X_{S-A}$ | $Y_{S-A}$ | $T_1$ |
| C | $X_{A-C}$ | $Y_{A-C}$ | $T_2$ |
| D | $X_{C-D}$ | $Y_{C-D}$ | $T_3$ |
| B | $X_{D-B}$ | $Y_{D-B}$ | $T_4$ |
| E | $X_{B-E}$ | $Y_{B-E}$ | $T_5$ |

Processing Time for Permutation A-C-D-B-E: $T = \Sigma T_i$

Each processing time T is calculated similarly for the 120 permutations. By comparing the 120 values of T, one permutation having a minimum value of T is specified and used for a printing order to be followed since the printing order following the specified permutation is the order requiring only the shortest processing time. The process thereafter is the same as that of the above embodiment.

In the printer according to the above embodiment, it takes 200 msec for the film inspecting component 11 to effect photometry and calculate an exposure amount, 100 msec for the printing component 10 to shift the film frame by frame (in the forward direction), and 100 msec for the same to effect the exposure. If the change in the trimming magnification for zooming the printing lens 25 requires longer than the 100 msec required for shifting the film, the printing efficiency would be low because of this change in the trimming magnification. However the calculating time required for obtaining the processing time T for each permutation is approximately 200 μsec. The total calculating time for obtaining the processing time by reading data of a series of five frames is 24 msec, since the calculation of each T is repeated 120 times. Therefore the present embodiment is sufficiently practical.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. A method for making a trimming print on photographic paper from a frame of photographic film in accordance with trimming magnification data indicating a degree of magnification said method comprising the steps of:

reading out said trimming magnification data for each frame of a series of frames in said film; and printing said series of frames in exposure in an order determined on the basis of said read-out trimming magnification data so as to minimize necessary adjustment of a zoom lens between any two of said frames to be printed.

2. A method as defined in claim 1, wherein said order follows an increasing order of said degree of magnification.

3. A method as defined in claim 1, wherein said order follows a decreasing order of said degree of magnification.

4. A method as defined in claim 1, further comprising the step of recording trimming magnification data on said film at the time of photo-taking with said film in correspondence with each of said frames.

5. A method as defined in claim 4 further comprising the step of using a zoom lens to make said trimming print.

6. A method for making a trimming print on photographic paper from a frame of photographic film in accordance with trimming magnification data indicating a degree of magnification, said method comprising the steps of:

reading out frame position data and said trimming magnification data for each frame of a series of frames in said film;

obtaining permutations by rearranging frames of said series;

calculating processing time to be taken by each of said permutations based on a length of time necessary to shift said film from one frame to a frame rearranged adjacent thereto and a time to change said trimming magnification degree;

selecting one of said permutations that takes the shortest processing time of said permutations; and printing said series of frames in exposure in an order following said specified permutation.

7. A method as defined in claim 6 further including the steps of:

comparing said film shifting time between said adjacently rearranged frames and said magnification changing time;

determining a frame processing time of said one frame as equal to the longer of said shifting time and said changing time in accordance with the result of said comparison; and obtaining said processing time by adding together each frame processing time for respective frames of said series.

8. A method as defined in claim 7, wherein said trimming magnification data are recorded on said film at the time of photo-taking with said film in correspondence with each of said frames.

9. A method as defined in claim 8 further comprising the step of using a zoom lens to make said trimming print.

10. A photographic printer for printing a frame at a specified trimming magnification by use of photographic film with data as to a degree of trimming magnification recorded thereon in correspondence with each of the frames, said printer comprising:

means for reading out said trimming magnification degree data for each frame of a series of frames in said film;

means for determining an order for printing said series of frames in an order based on said degree of trimming magnification read out by said reading-out means; and a zoom lens changeable as to a focal length in accordance with said read-out trimming magnification.

11. A photographic printer as defined in claim 10, wherein said order follows an increasing order of said trimming magnification.

12. A photographic printer as defined in claim 10 wherein said order follows a decreasing order of said trimming magnification.

13. A photographic printer for printing on photographic paper a frame in photographic film with data as to a degree of trimming magnification recorded thereon in correspondence with each of the frames by use of a zoom lens with the focal length set in accordance with a specified trimming magnification, said printer comprising:

means for reading out frame position data and said trimming magnification degree data for each frame of a series of frames in said film:

means for obtaining permutations by rearranging frames of said series;

means for calculating processing time to be taken by each of said permutations obtained by said permutation obtaining means based on a length of time necessary to shift said film from one frame to a frame rearranged adjacent thereto and a time to change said degree of trimming magnification on the basis of said frame position data and said trimming magnification data read out by said reading-out means: and means for specifying a permutation taking the shortest processing time of said permutations calculated by said time calculating means, said specified permutation being followed as an order for printing said series of frames.

14. A photographic printer as defined in claim 13, wherein said time calculating means comprises means for comparing said film shifting time between said adjacently rearranged frames and said magnification changing time, means for determining frame processing time of said one frame as equal to the longer of said shifting time and said changing time in accordance with the result of said comparison, and means for obtaining said processing time by adding together each frame processing time for respective frames of said series.

* * * * *